United States Patent
Lin et al.

(10) Patent No.: US 7,542,430 B2
(45) Date of Patent: Jun. 2, 2009

(54) SYSTEM AND METHOD FOR MEASURING END-TO-END NETWORK DELAY AND USER-PERSPECTIVE DELAY

(75) Inventors: Lisan Lin, Plano, TX (US); Michael Reiman, Plano, TX (US); Mark Chen, Carrollton, TX (US); Charles Moore, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 623 days.

(21) Appl. No.: 11/035,145

(22) Filed: Jan. 13, 2005

(65) Prior Publication Data

US 2006/0153091 A1     Jul. 13, 2006

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl. .................. 370/252; 370/324; 370/335; 370/395.1

(58) Field of Classification Search .............. 370/238, 370/229, 230, 233, 253, 252; 709/230; 375/225; 455/427, 404, 456, 521
See application file for complete search history.

(56) References Cited

U.S. PATENT DOCUMENTS

| | | | |
|---|---|---|---|
| 5,802,106 A * | 9/1998 | Packer | 375/225 |
| 6,161,018 A * | 12/2000 | Reed et al. | 455/456.1 |
| 6,738,349 B1 | 5/2004 | Cen | |
| 2004/0105386 A1 * | 6/2004 | Sipola | 370/230.1 |
| 2004/0133391 A1 | 7/2004 | Bovo et al. | |
| 2004/0170158 A1 | 9/2004 | Man-Hak Tso et al. | |
| 2007/0133475 A1 * | 6/2007 | Peisa et al. | 370/335 |

FOREIGN PATENT DOCUMENTS

| | | |
|---|---|---|
| WO | WO 01/20918 A | 3/2001 |
| WO | WO 0120918 A2 * | 3/2001 |

* cited by examiner

Primary Examiner—Ricky Ngo
Assistant Examiner—David Oveissi
(74) Attorney, Agent, or Firm—Fulbright & Jaworski L.L.P.

(57) ABSTRACT

A system and method for measuring user-perceived delay in an IP network, comprising detecting request and corresponding response messages at a monitoring point in the network, calculating an uplink delay based upon the time elapsed between the request and corresponding response messages, detecting response and corresponding transport acknowledgement messages at the monitoring point, wherein the response message is sent in response to the request message, calculating a downlink network delay based upon the time elapsed between the response and corresponding transport acknowledgement messages; and calculating a user-perceived delay by adding uplink delay and downlink network delay, wherein the user-perceived delay represents a time required for an IP message to travel from a user device to a network destination plus the time required for the service (server) to respond and return the response to the user device.

17 Claims, 4 Drawing Sheets

SYSTEM AND METHOD FOR MEASURING END-TO-END NETWORK DELAY AND USER-PERSPECTIVE DELAY

TECHNICAL FIELD

The present invention is directed generally to measuring network delay and, more particularly, to measuring the user-perspective delay for a mobile device.

BACKGROUND

Mobile handsets and wireless devices increasingly include the capability to access the Internet or to establish an IP session with other devices. Typically, these IP sessions are initiated by a browser or other application on the mobile handset. The user, for example, may request information from a particular URL or may enter the URL of a website to view on the mobile device. The browser or other application establishes an IP session with the device at the designated URL and then sends a request for the desired information. The destination server acknowledges the request and then processes the request, for example, by retrieving the requested information. The destination server then sends the requested information in a response message to the wireless device, which typically acknowledges the receipt of the response.

The above-described scenario includes several sources of delay that affect the amount of time that elapses between the user's request (e.g. choosing a menu selection or entering an desired URL) and the ultimate display of the requested information on the user's mobile handset. Delays are caused by the following sources: browser application delay for the processing time required to send a request message after receiving the user's input; wireless network delay while the request message travels to a gateway to the Internet; Internet and other network delay while the request message travels to the destination server; processing time at the server while the requested information is collected and sent to the user in a response message; Internet and network delay while the response message travels to the wireless gateway; wireless network delay while the response message travels to the mobile handset; and browser delay while the requested information is received, processed and displayed.

From the user's perspective, any delay is typically attributed to the wireless service provider even though much of the delay may be outside the service provider's control, such as the Internet and other network delays and the delay caused by a third-party server. Service providers would like to measure the user-perceived delay and would like to measure the round-trip delay for IP requests. However, service providers currently can only simulate what occurs out at the user's wireless device, because it is difficult to monitor a large number of wireless devices. Accordingly, there is a need to accurately measure the network delay and user-perceived delay and to measure the cause of delay in the IP sessions for wireless devices.

SUMMARY OF THE INVENTION

The present invention takes advantage of the acknowledgement messages that are sent in connection-oriented protocols such as Transport Control Protocol (TCP) and Wireless Transport Protocol (WTP). By assuming that the acknowledgement messages travel the same interfaces as the request and response messages and are subject to the same network and radio access problems, a monitoring device at some point in the network may measure the uplink and downlink delays and can calculate the end-to-end network delays and user-perceived delays.

In one embodiment, the present invention provides a method for measuring network delay in an IP network. Request and request acknowledgement messages are detected at a monitoring point in the network, and an uplink network delay is calculated. The uplink network delay is based upon the time elapsed between the request and request acknowledgement messages at the monitoring point. Response and response acknowledgement messages are also detected at the monitoring point. The response message is sent in response to the request message. A downlink network delay is calculated based upon the time elapsed between the response and response acknowledgement messages at the monitoring point. An end-to-end network delay is approximated by averaging a sum of the uplink and downlink delays for a complete user's session. The end-to-end network delay represents a time required for an IP message to travel from a user device to a network destination.

In alternative embodiments of the invention, the user device is a wireless device and the network destination is a web server. The request message is a message from a wireless device requesting information from an application running on a wired network. The monitoring point may be a Gateway GPRS Support Node (GGSN).

In other embodiments, separate uplink, downlink, and end-to-end network delays are calculated for each of a plurality of points in a wireless infrastructure network. The plurality of separate network delays may be compared to identify a component that causes a longest delay in the network.

The invention also provides a method for measuring user-perceived delay in an IP network. Request and request acknowledgement messages are detected at a network monitoring point. Response and response acknowledgement messages are also detected at the monitoring point. The response message is sent in response to the request message. A user-perceived delay is calculated based upon the time elapsed between the request and response acknowledgement messages at the monitoring point as well as the calculated downlink network delay. The user-perceived delay is the amount of time elapsed between when a user devices requests information and when the information is provided to the user device.

In alternate embodiments, an uplink application server delay is calculated based upon the time elapsed between the request and response messages at the monitoring point, and a downlink network delay is calculated based upon the time elapsed between the response and response acknowledgement messages at the monitoring point. The user-perceived delay is then calculated by adding the uplink application server delay and the downlink network delay. In one embodiment, a weighting factor is included in the calculation of the downlink network delay to emphasize the most recent delays of current response and response acknowledgement messages.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION

Figure 1:
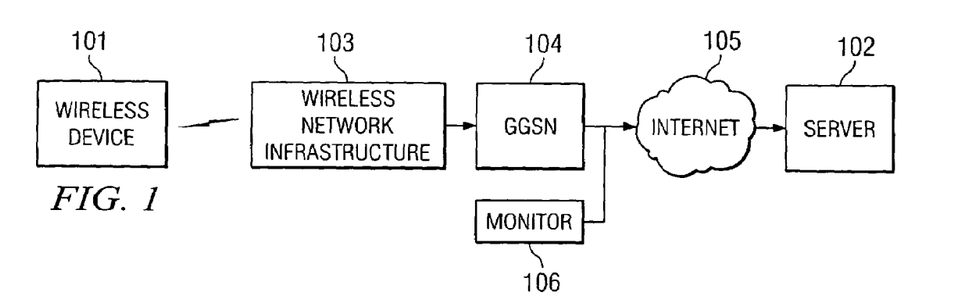
FIG. 1 is a block diagram of a system incorporating the present invention.

FIG. 1 is a block diagram of a system incorporating the present invention. A user at wireless device 101 desires to access information from server 102, such as an Internet web page, data files, or other applications. If the user wants to access an Internet web site that is hosted on server 102, the user may launch a browser application on wireless device 101. The user then enters the IP address or URL of the web site on the browser. The browser application then initiates a connection to server 102 to retrieve the desired information.

Wireless device 101 is in communication with wireless network infrastructure 103, which may be any wireless network now known or later developed and includes components such as base transceiver stations, base station controllers, wireless gateways, Serving GPRS Support Node (SGSN), gateway mobile switching centers and the like. Wireless network 103 is connected to Gateway GPRS Support Node (GGSN) 104, which provides an interface between wireless network 103 and Internet 105. Monitoring device 106 may be at GGSN 104 in one embodiment and passively monitors all IP data from wireless device 101 and the associated responses or acknowledgements from server 102.

The connection between wireless device 101 and server 102 is established across at least wireless network infrastructure 103, GGSN 104, and Internet 105. It will be understood that additional components, such as other servers and routers, are likely to be part of the connection between wireless device 101 and server 102. The physical distance between wireless device 101 and server 102, as well as the number of components that are part of the connection, causes delays in the queries and responses that are exchanged between wireless device 101 and server 102 during an IP session. As a result, when the user enters a request, such as a request to access a web site, the user perceives a delay before the requested information is obtained from server 102, sent to device 101 and displayed to the user. The present invention allows a service provider to monitor the delay times associated with connection-oriented IP sessions.

An IP session of the type described above uses the Transport Control Protocol (TCP), a connection-oriented protocol in which an acknowledgement is sent on the transport control layer for user data transferred across the connection. The present invention takes advantage of these acknowledgement messages to measure the end-to-end delay.

Figure 2A:
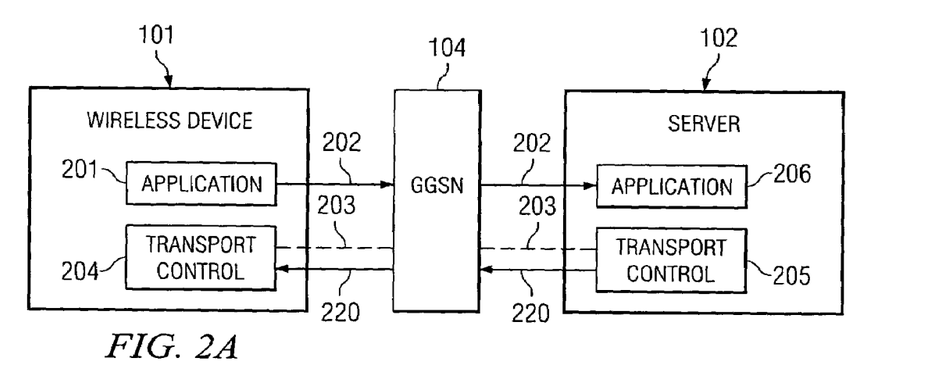
FIG. 2A is a block diagram illustrating a query sent from a wireless device to a server.

FIG. 2A is a block diagram illustrating a request sent from wireless device 101 through GGSN 104 to server 102. Application 201, such as a browser, on wireless device 101 initiates application-layer query 202 that is carried on transport layer 203 under control of transport control 204. At server 102, transport control 205 receives transport layer 203 and sends request 202 to application 206, which may be, for example, a web page. Transport control 205 may additionally send transport acknowledgement 220 upon receipt of request 202.

Figure 2B:
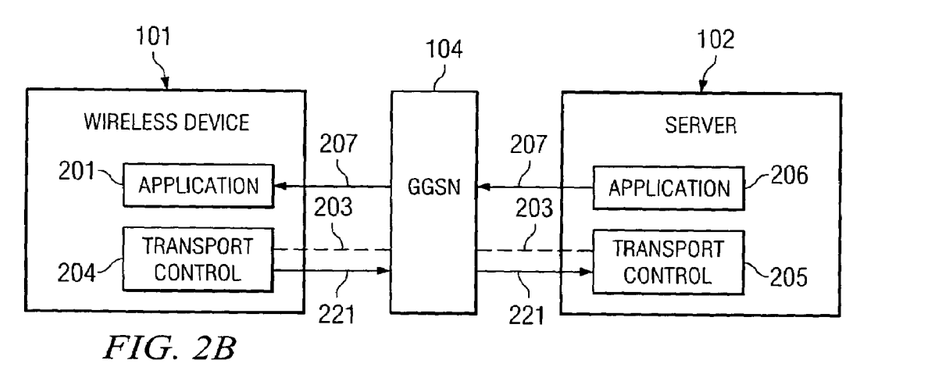
FIG. 2B is a block diagram illustrating an acknowledgement sent from the server to the wireless device.

FIG. 2B is a block diagram illustrating a response that is sent from server 102 to wireless device 101 in response to request 202. Upon receiving request 202, application 205 generates response 207, which is carried to wireless device on transport layer 203 under control of transport control 205. Transport control 204 myay additionally send transport acknowledgement 221 upon receipt of response 207. Response 207 is received by application 201 and contains results of the request 202. In FIGS. 2A and 2B, GGSN 104 or monitor 104 detects request 202, 203, response 207, 208, and transport acknowledgement messages 220, 221 as the messages that are exchanged between wireless device 101 and server 102.

Figure 3:
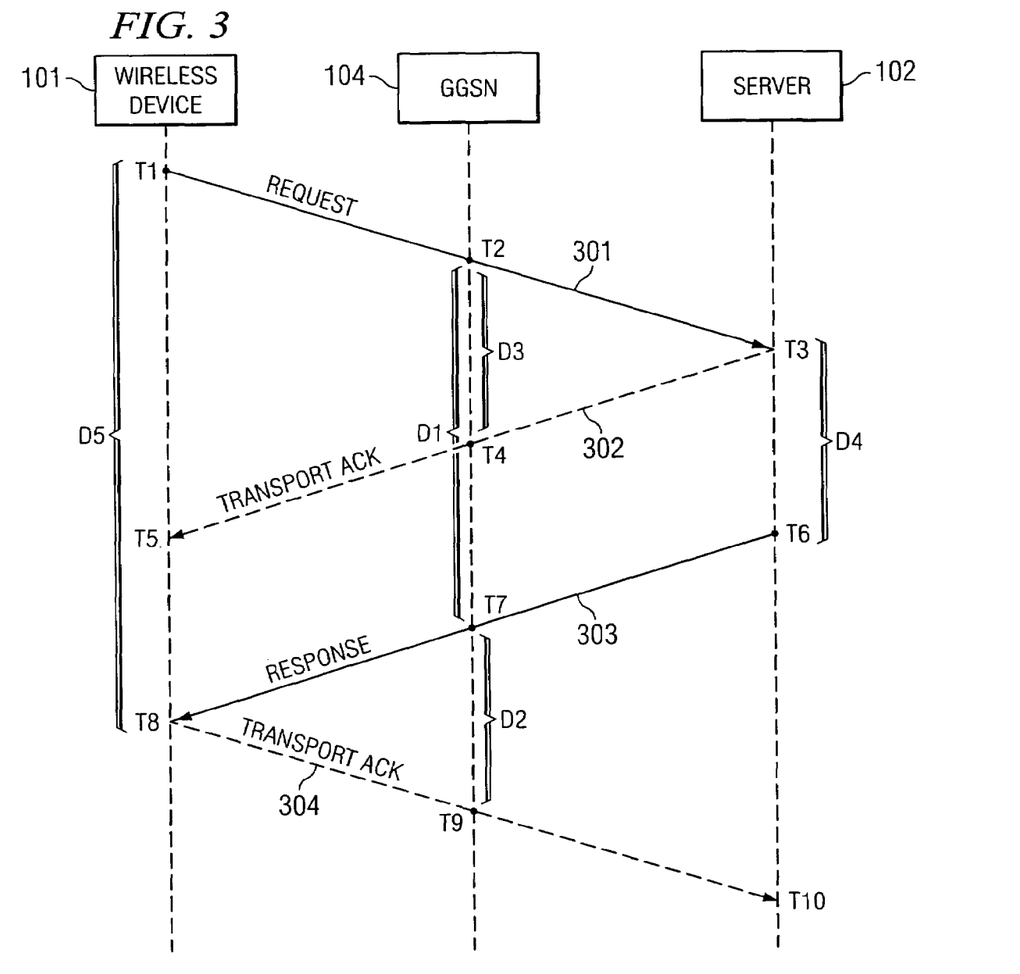
FIG. 3 illustrates messages exchanged between a wireless device and server according to one embodiment of the invention.

FIG. 3 illustrates messages exchanged between device 101 and server 102. Device 101 sends request 301, such as a file request, to server 102. Request 301 is sent at time T1, passes GGSN 104 at time T2, and arrives at server 102 at time T3. Upon receiving request 301, server responds with transport acknowledge message 302 to acknowledge the receipt of request 301. Transport acknowledge message 302 does not include the file that is requested in message 301, but is sent only to inform device 101 that request 301 has been received. Transport acknowledge message 302 is sent essentially immediately at time T3, passes GGSN 104 at time T4 and arrives at device 101 at time T5. The delay, if any, at time T3 is minor and would be due to protocol delays having very little latency.

Server 102 obtains the requested information or file and sends it to device 101 in response 303. There is a delay while server 102 obtains the requested information. Response 303 is sent by server 102 at time T6, passes GGSN 104 at time T7, and arrives at device 101 at time T8. Device 101 acknowledges the receipt of response 303 in transport acknowledge message 304, which is sent at time T8, passes GGSN 104 at time T9 and arrives at server 102 at time T10.

The user at device 101 requests information from server 102 at time T1, but does not receive the requested information until time T8. The delay from T1 to T8 is the user-perceived delay. The user-perceived delay is due to many factors including; (1) the delay from T1 to T3, which is the transmission time for request 301, (2) the delay from T3 to T6, which is the processing time for server 102, and (3) the delay from T6 to T8, which is the transmission time of response 303.

The actual service delay ("D4") is the time between T3 and T6, from when the server receives a request until the server responds to the request. However, the user-perceived delay is from T1 to T8, which may be much longer than the time from T3 to T6. Often the user will blame the wireless network service provider for the entire user-perceived delay. However, much of the delay occurs outside the wireless network and the service provider has little, if any, control over this delay. For example, the delay from T2 to T3 and from T6 to T7 is caused by transmission delays between the GGSN and the server across Internet 105 (FIG. 1). Also, the delay from T3 to T6 is due to the processing at server 102, such as receiving and processing request 301, obtaining the requested information, and generating response 303. The wireless service provider would like to measure the user-perceived delay, but cannot directly calculate the end-to-end delay except at the wireless device. By observing the request, response and transport acknowledgement messages at an observation point, such as at GGSN 104, for example, the service provider may estimate the user-perceived delay.

At a network observation point, such as at GGSN 104, the total user-perceived delay can be determined by adding the wireless network delay (i.e. the network downlink delay) and the server-side delay. In one embodiment, request 301 is assumed to have the same transmission time as transport acknowledge message 304, and that response 303 has the same transmission time as request transport message 302. The network downlink delay ("D2") can be measured at GGSN 104 as the total time from T7 to T9. The uplink network delay ("D3") can be measured at GGSN 104 as the total time from T2 to T4. The uplink delay ("D1") can be measured at GGSN 104 as the total time from T2 to T7. The server delay ("D4") can be calculated at GGSN 104 as the uplink delay ("D1") minus the uplink network delay ("D3"). The user-perspective delay ("D5") can be calculated as the uplink delay ("D1") plus the network downlink delay ("D2").

The end-to-end network delay (ND) and the user-perspective delay (UPD) can be calculated as follows:

$$ND = \frac{D2 + D3}{2}$$

$$UPD = D1 + D2$$

To calculate delay D1, GGSN 104 timestamps and correlates messages at the application layer into transactions based on understanding of the application layer protocol. For example, an HTTP transaction latency could be the delay between a "GET" message and a "STATUS" message. The D1 delay is the difference between the time of the initial response and the time of the initial query. This corresponds to the time T7-T2, which includes the network uplink delay.

The TCP sequence number acknowledgement mechanism can be used to calculate delay D2. The uplink and downlink delays can be calculated by time stamping TCP packets (not application messages) and correlating TCP transport acknowledge messages with the correlating application layer message. The D2 delay is the difference between the time of transport acknowledge messages for an application layer message and the time of the application layer message itself. This corresponds to the time T9-T7.

By adding D1 and D2, the estimated UPD is obtained for time latency T2 to T9. Since the true UPD is T1 to T8, the value of D1+D2 is an estimate with error value "E." The error can be represented as follows:

$$E=(T2-T1)-(T9-T8)$$

E is randomly distributed independent of application queries. Therefore, for accumulated estimated UPD across different queries:

$$\left|\sum E\right| \cong 0$$

An adaptive (recursive) weighting function, such as the one used by TCP round trip delay time estimated algorithm, may be used to smooth the estimated UPD. To emphasize the most recent user experience (i.e. the last downlink network delay, D2), the weighting factor on the current sample may be higher than TCP recommendations. For example, the weighting factor for the current sample may be set at 0.9, instead of the recommended 0.5. The smoothed estimated D2' delay may be expressed as:

$$D2'=D2'\times(1-\alpha)+D2\times\alpha$$

where $\alpha$ is the weighting factor, such as 0.9, for example. The smoothed total UPD is $$UPD=D2'+D1$$

D2' represents the most recent downlink network delays across a set of D2 measurements or calculations.

While D2 represents the downlink network delay (i.e. from GGSN 104 to device 101 to GGSN 104) at the monitor reference point, the uplink network delay D3 (i.e. from GGSN 104 to server 102 to GGSN 104) may be calculated using the same smoothing algorithm recited above. The delay D3 is the difference in time from T2 to T4.

The end-to-end network delay time "ND" may be expressed as follows:

$$ND = \frac{D2 + D3}{2};$$

and the server processing delay "S" is $$S=D1-D3.$$

An alternative embodiment offers the use of multiple monitoring reference points through the traffic paths. The network delay difference between reference points therefore results in network delay per path segment. This information may be used for troubleshooting.

By extracting important information from user application layer messages and the mobile control signaling messages, such as network elements (Server Address, GGSN, SGSN, BSC, RAI, CELL) and handset profiles, aggregating ND or UPD by proper combination of elements in real time provides information about the network, server, and handset performance.

Although the exemplary embodiments described and illustrated herein focus on TCP connections, it will be understood that the present invention shall apply to any non-TCP transport protocols that support connection-oriented procedures. For example, the present invention may be used with WTP by tracking its class 2 transactions.

The above-described monitoring may be accomplished at GGSN 104 (FIG. 1). GGSN 104 may have application software that tracks and correlates messages that it passes, or a separate monitoring device, such as monitor 106, may be used to track messages that pass GGSN 104. It will be understood that in other embodiments, GGSN 104 does not have to be used to monitor the message. Instead, the monitoring may be accomplished at other points in the network. For example, messages may be monitored at any server, router, or other component in the signal path of the messages or acknowledgements.

The present invention allows the service provider to monitor a large number of client devices or mobile handsets because it does not require the monitoring equipment to be located at each individual mobile device. The client devices may include, for example, personal digital assistants, mobile telephone, or laptop computer enabled with any fixed or wireless data-service-enabled client. The present invention does low level correlation between application requests, responses, and transport acknowledgement messages that are associated with particular devices and calculates the uplink network delay, downlink network delay and user-perceived delay for each transaction. The user-perceived delay and network delays can be determined on a per wireless device or per session basis, thereby allowing the service provider to determine the level of service that is being provided to individual customers.

Using the present invention, the service provider may also identify which devices, services, network elements, or geographic areas (or cells) cause the most or least delay. For example, by analyzing delay per handset and correlating handset types, a service provider may identify which model handset or which browser has the longest delay. Alternatively, by analyzing and correlating delay data on a per website or per service basis, the service provider may identify which third-party application or server is causing the most or least delay. This would allow the service provider to evaluate the availability or responsiveness of servers or applications that are accessed by users.

Figure 4:
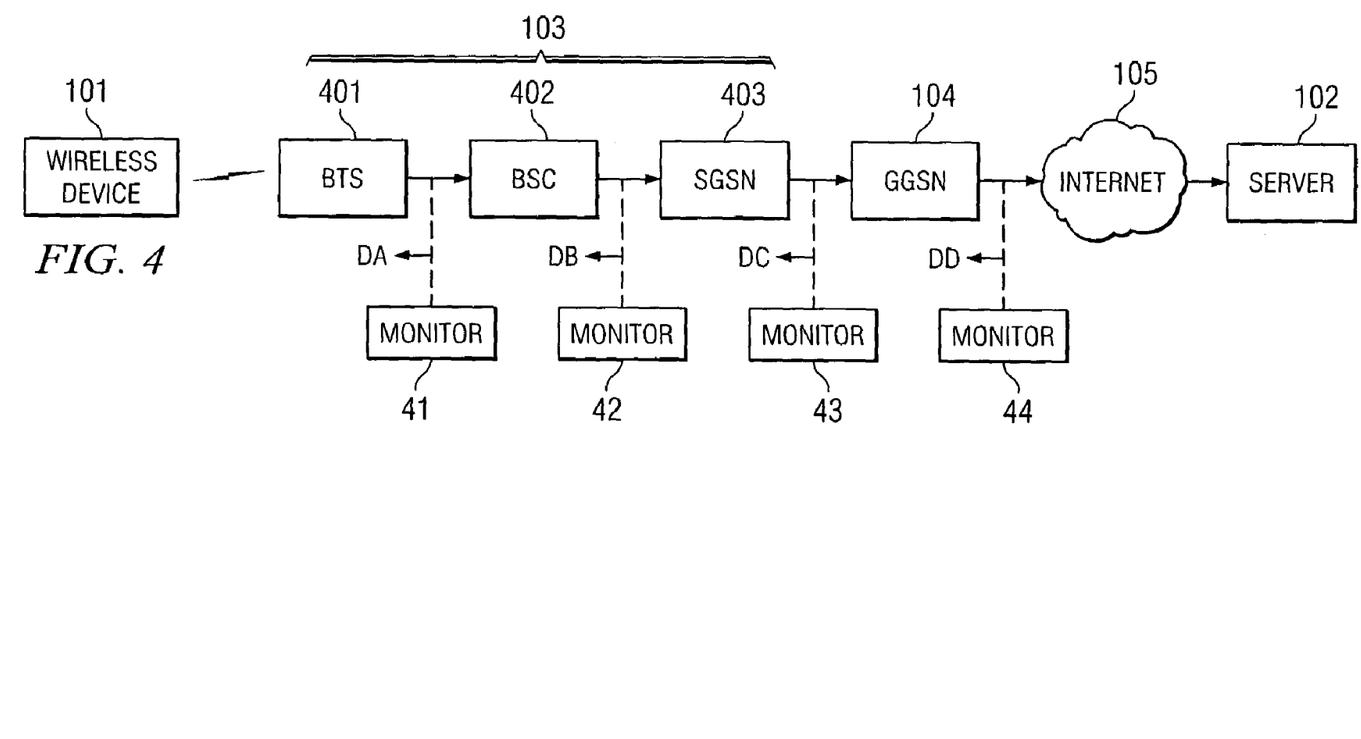
FIG. 4 is a block diagram of a system incorporating an alternative embodiment of the present invention.

FIG. 4 is a block diagram of a system incorporating an alternative embodiment of the present invention. The system illustrated in FIG. 4 is similar to the system of FIG. 1, however, wireless infrastructure 103 is shown in more detail as base transceiver station (BTS) 401, base station controller (BSC) 402, and Serving GPRS Service Node (SGSN) 403. It will be understood by those of skill in the art that other components may be included in wireless infrastructure 103 and that the network illustrated in FIG. 4 is simplified for purposes of illustration. The uplink and downlink network delays and user-perceived delay, which was discussed above as being measured at GGSN 104, may also be measured at any of the other network components, such as BTS 401, BSC 402 or SGSN 403. Those devices may include internal applications for monitoring and calculating network delays, or they may include external monitoring devices, such as monitors 41-44, that detect request, response and transport acknowledgment messages in the network.

By monitoring the uplink and/or downlink network delays at several points in the network, a service provider may determine whether certain components are causing excessive delay. Delay DA may be the portion of the delay caused by BTS 401 as detected by monitor 41. Similarly, delays, DB, DC and DD are the portions of the delays detected at BSC 402, SGSN 403 and GGSN 104, respectively. By comparing these delay components, the service provider may identify which components cause the greatest delay. For example, if delay DA is 40 ms, DB is 60 ms, and DC is 90 ms, then the service provider can identify SGSN 403 as causing more delay (30 ms) than BSC 402 (20 ms). The service provider may then target SGSN 403 for upgrades or improvements to route IP messages more quickly.

Figure 5:
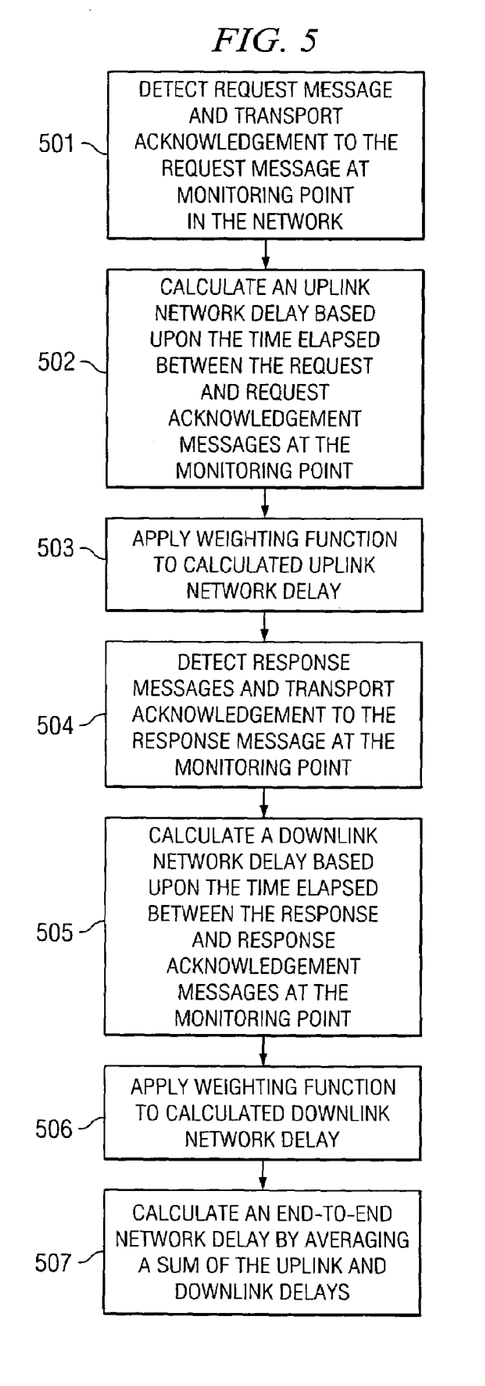
FIG. 5 is a flowchart illustrating a process for measuring end-to-end network delay accordingly to one embodiment of the invention.

FIG. 5 is a flowchart illustrating a process for measuring end-to-end network delay accordingly to one embodiment of the invention. At 501, request and transport acknowledgement messages are detected at a monitoring point in the network. At 502, an uplink network delay is calculated based upon the time elapsed between the request and transport acknowledgement messages at the monitoring point. In one embodiment of the invention, a weighting function, such as an adaptive or recursive weighting function, may be used in step 503 to smooth the calculated uplink network delay or to emphasize the most recent observations.

At 504, response and transport acknowledgement messages are detected at the monitoring point. The response message is sent in response to the request message that was detected at 501. At 505, a downlink network delay is calculated based upon the time elapsed between the response and transport acknowledgement messages at the monitoring point. In one embodiment of the invention, a weighting function, such as an adaptive or recursive weighting function, may be used in step 506 to smooth the calculated downlink network delay or to emphasize the most recent observations. At 507, an end-to-end network delay is calculated by averaging a sum of the uplink and downlink delays. The end-to-end network delay represents a time required for an IP message to travel from a user device to a network destination.

Figure 6:
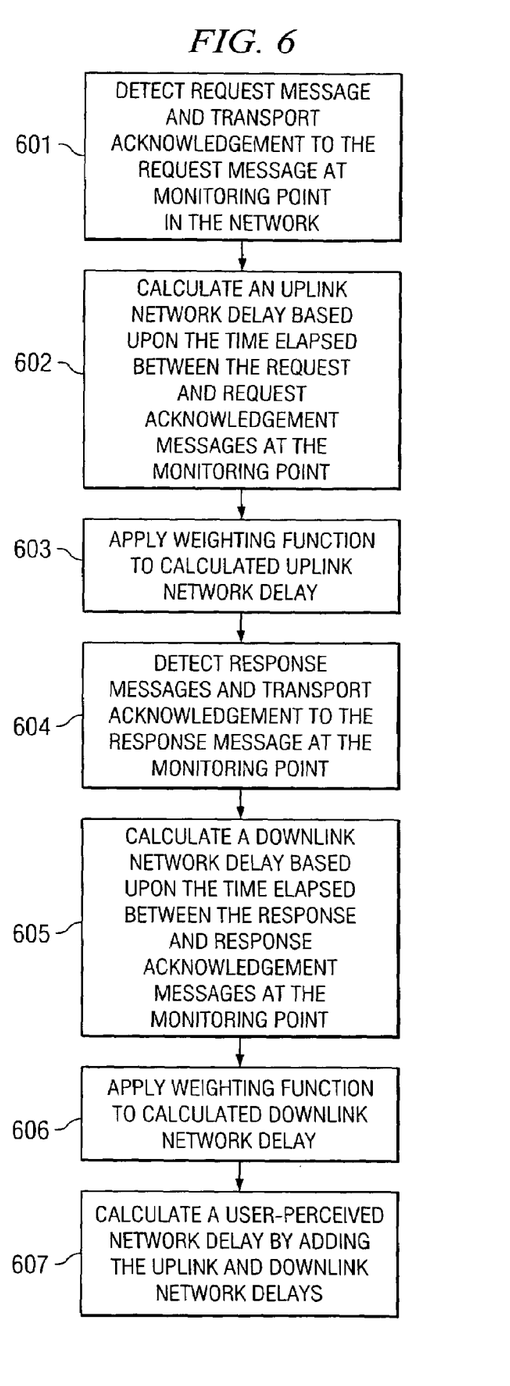
FIG. 6 is a flowchart illustrating a process for measuring end-to-end user-perceived delay accordingly to an alternative embodiment of the invention.

FIG. 6 is a flowchart illustrating a process for measuring user-perceived delay accordingly to one embodiment of the invention. At 601, request and transport acknowledgement messages are detected at a monitoring point in the network. At 602, an uplink network delay is calculated based upon the time elapsed between the request and request acknowledgement messages at the monitoring point. In one embodiment of the invention, a weighting function, such as an adaptive or recursive weighting function, may be used in step 603 to smooth the calculated uplink network delay or to emphasize the most recent observations.

At 604, response and transport acknowledgement messages are detected at the monitoring point. The response message is sent in response to the request message that was detected at 601. At 605, a downlink network delay is calculated based upon the time elapsed between the response and response acknowledgement messages at the monitoring point. In one embodiment of the invention, a weighting function, such as an adaptive or recursive weighting function, may be used in step 606 to smooth the calculated downlink network delay or to emphasize the most recent observations. At 607, a user-perceived delay is calculated by adding the uplink and downlink delays. The user-perceived delay is the amount of time elapsed between when a user devices requests information and when the information is provided to the user's device.

A network component, such as a GGSN, or a separate monitoring device may be used for measuring user-perceived delay in an IP network. The component or device includes means for detecting request and transport acknowledgement messages, and means for detecting response and transport acknowledgement messages, wherein the response message is sent in response to the request message. The detection means may be a processor, Application Specific Integrated Circuit (ASIC) or other component that receives messages that are being passed through the network. The detection means identifies the request, response and acknowledgement messages and time-stamps the messages for comparison to other message and to calculate delay. The calculating means may be a processor, ASIC or other component that uses the time elapsed between the request, response and acknowledgement messages to calculate a user-perceived delay.

Alternatively, a network component, such as a GGSN, or a separate monitoring device may be used for measuring network delay in an IP network. The component or device includes means for detecting request and transport acknowledgement messages in the network, and means for detecting response and transport acknowledgement messages, wherein the response message is sent in response to the request message. The detecting means may be a processor, ASIC or other component that receives messages that are being passed through the network. The detection means identifies the request, response and acknowledgement messages and timestamps the messages for comparison to other message and to calculate delay. The network component or device also includes means for calculating a uplink network delay based upon the time elapsed between the request and transport acknowledgement messages, means for calculating an downlink network delay based upon the time elapsed between the response and transport acknowledgement messages, and means for calculating an end-to-end network delay by averaging a sum of the uplink and downlink delays, wherein the end-to-end network delay represents a time required for an IP message to travel from a user device to a network destination. The calculating means may be a processor, ASIC or other component that uses the time elapsed between the request, response, and acknowledgement messages to calculate a network delay.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for measuring network delay in an IP network, comprising:
   detecting request and corresponding transport acknowledgement messages at a monitoring point device, said monitoring point device disposed at an interface between a wireless network and the IP network;
   calculating an uplink network delay based upon the time elapsed between detections of the request and transport acknowledgement messages at the monitoring point device;
   detecting response and corresponding transport acknowledgement messages at the monitoring point device, wherein the response message is sent in response to the request message;
   calculating a downlink network delay based upon the time elapsed between detections of the response and transport acknowledgement messages at the monitoring point device; and
   calculating an end-to-end network delay by averaging a sum of the uplink and downlink delays, wherein the end-to-end network delay represents a time required for an IP message to travel from a user device to network destination.

2. The method of claim 1 further comprising:
   applying a weighting function to the calculated uplink network delay to generate a smoothed uplink network delay; and
   wherein said end-to-end network delay is calculated using the smoothed uplink network delay.

3. The method of claim 1 further comprising:
   applying a weighting function to the calculated downlink network delay to generate a smoothed downlink network delay; and
   wherein said end-to-end network delay is calculated using the smoothed downlink network delay.

4. The method of claim 1 wherein the request message is a message from a wireless device information requesting information from an application running on a web server.

5. The method of claim 1 wherein the monitoring point device is an IP interface at a Gateway GPRS Support Node (GGSN).

6. The method of claim 1 further comprising:
   calculating a separate end-to-end network delay for each of a plurality of points in a wireless infrastructure network.

7. The method of claim 6 further comprising:
   comparing the plurality of separate end-to-end network delays to identify a component with a longest delay.

8. A method for measuring user-perceived delay in packet-switched network, comprising:
   detecting request and corresponding response messages at a monitoring point device in the network;
   calculating an uplink network delay based upon the time elapsed between detections of the request and corresponding response messages at the monitoring point device, wherein the uplink network delay is attributable to a first one of a circuit-switched network and the packet-switched network;
   detecting response and corresponding transport acknowledgement messages at the monitoring point device, wherein the response message is sent in response to the request message;
   calculating a downlink network delay based upon the time elapsed between detections of the response and transport acknowledgement messages at the monitoring point device, wherein the downlink network delay is attributable to a second one of the circuit-switched network and the packet-switched network; and
   calculating a user-perceived delay by adding the calculated uplink network delay and downlink network delay, wherein the user-perceived delay is the amount of time elapsed between when a user device requests information and when the information is provided to the user device.

9. The method of claim 8 further comprising:
   applying a weighting function to the calculated downlink network delay to generate a smoothed downlink network delay; and
   wherein said user-perceived delay is calculated using the smoothed downlink network delay.

10. The method of claim 9 wherein the step of calculating a downlink network delay further comprises:
    including a weighting factor in a downlink delay calculation to emphasize current response and transport response-acknowledgement messages.

11. The method of claim 10 wherein the weighting factor is between 0.5 and 0.9.

12. The method of claim 8 wherein the user device is a client device.

13. The method of claim 10 wherein the network destination is a server.

14. The method of claim 8 wherein the request message is a message from a client device requesting information from an application running on a wired network.

15. The method of claim 8 wherein the network monitoring point device is an IP interface at a Gateway GPRS Support Node (GGSN).

16. A system for measuring user-perceived delay in an IP network, comprising:

- means for detecting, at a monitoring point disposed between a requesting device and a responding server device, request and corresponding transport acknowledgement messages;
- means for calculating an uplink network delay based upon the time elapsed between the request being observed at the monitoring point and corresponding transport acknowledgement messages being observed at the monitoring point;
- means for detecting, at the monitoring point, response and corresponding transport acknowledgement messages, wherein the response message is sent in response to the request message;
- means for calculating a downlink network delay based upon the time elapsed between the response being observed at the monitoring point and the corresponding transport acknowledgement messages being observed at the monitoring point; and
- means for calculating a user-perceived delay by adding the calculated uplink network delay and downlink network delay, wherein the user-perceived delay is the amount of time elapsed between when a user devices requests information and when the information is provided to the user device.

17. A system for measuring network delay in an IP network, comprising:

- means for detecting, at a monitoring point disposed between a requesting device and a responding server device, request and corresponding transport acknowledgement messages in the network;
- means for calculating an uplink network delay based upon the time elapsed between the request being observed at the monitoring point and corresponding transport acknowledgement messages being observed at the monitoring point;
- means for detecting, at the monitoring point, response and corresponding transport acknowledgement messages, wherein the response message is sent in response to the request message;
- means for calculating a downlink network delay based upon the time elapsed between the response being observed at the monitoring point and the corresponding transport acknowledgement messages being observed at the monitoring point; and
- means for calculating an end-to-end network delay by averaging a sum of the uplink and downlink network delays, wherein the end-to-end network delay represents a time required for an IP message to travel from a user device to a network destination.

* * * * *